Figure 1:
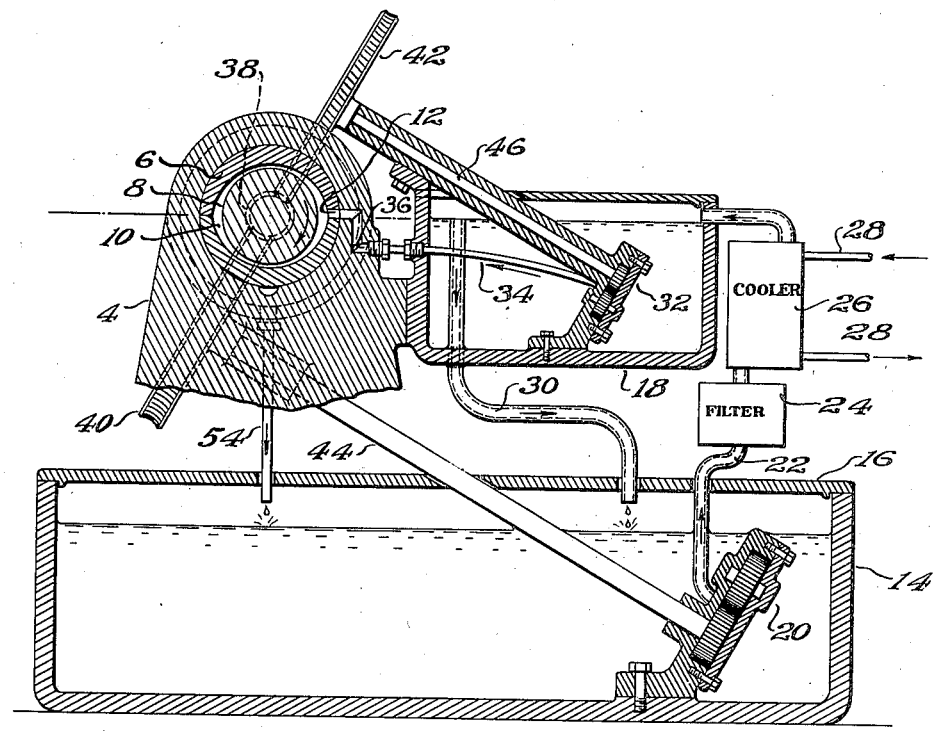

Oct. 8, 1940.                O. D. H. BENTLEY                2,217,329
                        LUBRICATING METHOD AND SYSTEM
                            Filed Oct. 14, 1937

Witness
Paul F. Bryant

Inventor
Oliver D. H. Bentley
by his attorneys
Fish, Hildreth, Cary & Jenney

Patented Oct. 8, 1940

2,217,329

UNITED STATES PATENT OFFICE 2,217,329

LUBRICATING METHOD AND SYSTEM

Oliver D. H. Bentley, Norfolk, Mass.

Application October 14, 1937, Serial No. 168,955

7 Claims. (Cl. 184—6)

The present invention relates to lubricating methods and systems and more particularly to methods and systems especially adapted for the lubrication of the main bearings of high speed machines such as turbines and the like.

With many types of machines which are adapted to run at high speeds, it is customary, each time the machine is started after being idle for any appreciable period of time, to run the machine at reduced speed for several minutes. This warming-up period is particularly essential in the case of machines which operate at high temperatures such as steam turbines, where the preliminary operation at low speeds permits the parts to become thoroughly heated and expanded to operating condition before the load is applied.

In order to secure proper lubrication of the main bearings of such machines at the normal, high speed of operation, lubricating fluid must be supplied to the bearings in copious quantities and under considerable pressure. The arrangement commonly employed consists of an oil reservoir or sump in the base of the machine, from which oil is supplied to the bearings by means of a pump driven by the machine, excess fluid being returned from the bearing to the sump for recirculation.

This arrangement, while satisfactory for continuous operation at normal high speeds, is subject to serious drawbacks when employed on a machine which is operated intermittently, due to the fact that the oil drains from the bearing back into the sump through the return conduit, and the supply pipe also empties. As a result, the bearing is without lubrication when the machine is first started, and in many cases this lack continues during the warming-up period, the speed of the machine during this time being inadequate to enable the pump to raise the oil to the bearing. In such cases, a proper supply of oil is obtained only when the speed of the machine is raised to its normal operating value. The result of operating the machine, even at low speeds, without adequate lubrication, is obviously to cause excessive bearing wear and consequent early failure of the parts.

It is an object of the present invention to provide a lubrication method and system to supply positive lubrication to the main bearings of high speed machines not only when the machine is operating at normal speeds, but also when the machine is run at low speeds during the warming-up period.

Another object of the invention is to provide a lubricating system for the main bearings of high speed machines which is actuated by the machine and which is adapted to supply lubricating fluid to the bearing immediately upon the starting of the machine.

With these and other objects in view, a feature of the present invention consists in the method and system for lubricating a bearing of a turbine or the like wherein a supply of lubricating fluid is maintained at all times at substantially the level of the bearing, and is delivered therefrom under pressure to the bearing immediately upon the starting of the machine.

Another feature of the invention is the provision of a second supply at a lower level than the first to which the lubricating fluid is returned from the bearing and from which the fluid is delivered to the first and higher level supply by suitable pumping devices.

Still another feature is the provision of filtering and cooling devices through which the lubricating fluid passes on its way from the lower to the higher supply.

Figure 2:
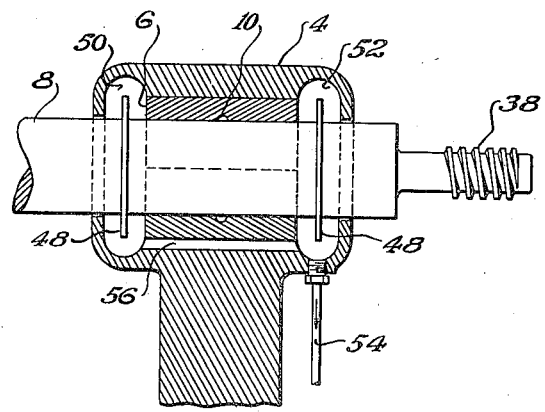

In the accompanying drawing which illustrates the invention as embodied in a high speed steam turbine, Fig. 1 is a sectional view in side elevation of one of the main bearings to which has been applied the lubrication system arranged and operating according to the present invention, and Fig. 2 is a detail sectional view of the bearing and a portion of the shaft showing the worm gear for driving the lubricating fluid pumps.

A portion of the frame of the machine embodying the bearing and the lubricating system is indicated at 4, this portion serving as a support for the bearing 6 in which the shaft 8 is journalled. The bearing 6 is provided midway its ends with an oil distributing groove or channel 10 extending around the inside of the bearing. An oil inlet 12 opens into the distributing channel at substantially the height of the center of the shaft.

Positioned below the bearing is a reservoir or sump 14 containing the main supply of lubricating fluid. The sump is provided with a cover 16 to exclude dirt.

From the sump lubricating fluid is supplied to a supplementary reservoir 18 mounted adjacent the bearing 6 at approximately the level thereof. The oil is raised by means of a gear pump 20 of conventional construction, the pump being immersed in the fluid so as to be primed at all times.

In the supply pipe 22 connecting the outlet of the pump with the supplementary reservoir are located an oil filter 24 and oil cooler 26 of conventional design, the cooling unit being supplied with circulating water through inlet and outlet pipes 28.

The supply pipe 22 discharges into the supplementary reservoir above the level of the fluid therein to prevent the supplementary reservoir from emptying back through the pipe into the sump when the machine stops. The level of the fluid in the reservoir is maintained at the level of the oil inlet 12 in the bearing 6 by means of an overflow pipe 30 which returns excess oil to the sump, the top of the pipe being on a level with the oil inlet in the bearing, the capacity of the pump 20 at normal high speed being slightly in excess of the requirements for the bearing.

The supplementary reservoir is provided with a pump 32 similar to pump 20 but at slightly smaller capacity, the pump being mounted on the bottom of the reservoir below the surface of the liquid. The outlet side of the pump is connected by pipe 34 to a passage 36 in the frame of the machine leading to and communicating with the oil inlet 12 in the bearing 6.

The pumps 20 and 32 are driven from a worm gear 38 formed on a reduced end portion of the main shaft of the machine, the worm meshing with gears 40 and 42 on the drive shafts 44 and 46 of the pumps 20 and 32 respectively.

The shaft 8 is provided with the usual rings 48 at each end of the bearing for collecting and throwing off the oil which works outwardly from the bearing, the oil being collected in annular recesses 50 and 52 at each end of the bearing housing and returned to the sump by a pipe 54. A passage 56 in the housing conducts the oil from the inner collecting recess 50 to the outlet pipe.

It is evident that in the lubricating system as described and illustrated, when the machine stops rotating and the pumps cease to function, the level of the oil in the supplementary reservoir remains constant at the level of the inlet to the bearing. The oil actually in the bearing drains into the collecting recess and through the return pipe 54 to the sump, and the oil in supply pipe 22 runs back to the sump through pump 20, but since the supply pipe empties into the supplementary reservoir above the level of the liquid no drainage or siphoning action can take place.

When the machine is started, therefore, even after a long shut-down period, the supplementary reservoir contains oil at exactly its normal operating level, namely, the level of the oil inlet 12 in the bearing 6. The supply pump 32 for supplying oil under pressure to the bearing is likewise primed and the bearing supply pipe 34 full, since the pump and pipe are immersed at all times. With the first revolutions of the main shaft of the machine the pump 32 begins to function, and even though the rotation may be extremely slow, the pump is enabled to supply oil to the bearing in adequate quantities since no preliminary lifting of the oil to a higher level is required and only an extremely small pressure increase is necessary to cause the oil to enter the inlet to the bearing.

The supplementary reservoir contains an ample quantity of oil to lubricate the bearing during the warming-up period in spite of the fact that there may be little or no oil supplied to the reservoir from the sump during this preliminary low speed operation. As the speed of the machine is raised to normal working value, the pump in the main reservoir is enabled to overcome the pressure head due to the difference in levels of the two reservoirs, and oil is then supplied to the supplementary reservoir, the fluid passing through the filter and cooler for conditioning.

Since, as already stated, the pump 20 in the sump is of somewhat greater capacity than supply pump 32 for the bearing, the supplementary reservoir is quickly filled and maintained in that condition, the excess supply running into the overflow pipe and back to the sump, even though at the normal operating speed of the machine oil is supplied to the bearings in relatively large quantities and under considerable pressure to insure rapid circulation of oil through the bearing both for lubrication and cooling.

The location of the oil cooler and filter in the supply pipe between sump and supplementary reservoir results in the lubricating fluid circulating through the conditioning units more rapidly than would be the case if the filter and cooler were located according to conventional practice in the direct supply to the bearings, and further insures a free and unobstructed flow of the fluid to the bearing at low speeds. By the more rapid circulating of the lubricating fluid through filter and cooler, the conditioning of the oil may be more complete for a given size of filtering and cooling unit, insuring that the oil in the sump is maintained in thoroughly cooled and filtered condition even after long periods of continuous operation.

Although the invention has been illustrated and described as embodied in a specific arrangement and adapted for use in a particular type of machine, the invention is not so limited, but is adapted for use in machines of other types, and may be embodied in other constructions and arrangements within the scope of the appended claims.

Having thus described the invention, what is claimed is:

1. A lubricating system for a bearing of a machine, comprising a bearing having an inlet, a lubricating fluid reservoir positioned relative to the bearing so as to include and depend below the level of the bearing inlet, the portion of said reservoir depending below the level of the bearing inlet being constructed to maintain a sufficient supply of lubricating fluid substantially at the level of the bearing inlet during idle periods of the machine in readiness for immediate delivery to the bearing upon starting of the machine and for continuous delivery thereafter for a substantial period of time without replenishment of the supply of lubricating fluid, means for delivering lubricating fluid under pressure from said reservoir to the bearing inlet during all periods of operation of the machine, and means for returning for reuse the lubricating fluid from the bearing to the fluid reservoir at a point above the level of the bearing inlet.

2. A lubricating system for a bearing of a machine, comprising a bearing having an inlet, a lubricating fluid reservoir positioned relative to the bearing so as to include and depend below the level of the bearing inlet, the portion of said reservoir depending below the level of the bearing inlet being constructed to maintain a sufficient supply of lubricating fluid substantially at the level of the bearing inlet during idle periods of the machine in readiness for immediate delivery to the bearing upon starting of the machine and for continuous delivery thereafter for a substantial period of time without replenishment of the supply of lubricating fluid, means for delivering lubricating fluid under pressure from said reservoir to the bearing inlet during all periods of operation of the machine, a lubricating fluid sump located below the level of the bearing, means for draining lubricating fluid from the bearing to said sump, and means for delivering lubricating fluid from the sump to the fluid reservoir at a point above the level of the bearing inlet.

3. A lubricating system for a bearing of a machine, comprising a bearing having an inlet, a lubricating fluid reservoir positioned relative to the bearing so as to include and depend below the level of the bearing inlet, the portion of said reservoir depending below the level of the bearing inlet being constructed to maintain a sufficient supply of lubricating fluid substantially at the level of the bearing inlet during idle periods of the machine in readiness for immediate delivery to the bearing upon starting of the machine and for continuous delivery thereafter for a substantial period of time without replenishment of the supply of lubricating fluid, means for delivering lubricating fluid under pressure from said reservoir to the bearing inlet during all periods of operation of the machine, a lubricating fluid sump located below the level of the bearing, means for draining lubricating fluid from the bearing to said sump, means for delivering lubricating fluid from the sump to said fluid reservoir, said means being constructed and arranged to prevent the withdrawal therethrough of lubricating fluid from the fluid reservoir during idle periods of the machine, said last means being capable of delivering lubricating fluid to said reservoir from the sump at a faster rate than the lubricating fluid is delivered from the reservoir to the bearing inlet, and means for returning excess lubricating fluid from said reservoir to the sump when the level of the fluid in the reservoir rises above the level of the bearing inlet.

4. A lubricating system for a bearing of a machine, comprising a bearing having an inlet, a lubricating fluid reservoir positioned relative to the bearing so as to include and depend below the level of the bearing inlet, the portion of said reservoir depending below the level of the bearing inlet being constructed to maintain a sufficient supply of lubricating fluid substantially at the level of the bearing inlet during idle periods of the machine in readiness for immediate delivery to the bearing upon starting of the machine and for continuous delivery thereafter for a substantial period of time without replenishment of the supply of lubricating fluid, a fluid pump having its inlet communicating with the fluid reservoir at a point below the level of the bearing inlet and its outlet communicating with said bearing inlet, means for driving said pump from the shaft of the machine which is supported by the bearing being lubricated, and means for returning for reuse the lubricating fluid from the bearing to the fluid reservoir at a point above the level of the bearing inlet.

5. A lubricating system for a bearing of a machine, comprising a bearing having an inlet, a lubricating fluid reservoir positioned relative to the bearing so as to include and depend below the level of the bearing inlet, the portion of said fluid reservoir depending below the level of the bearing inlet being constructed to maintain a supply of lubricating fluid substantially at the level of the bearing inlet during idle periods of the machine in readiness for immediate delivery to the bearing upon starting of the machine and for continuous delivery thereafter for a substantial period of time without replenishment of the supply of lubricating fluid, a fluid pump having its inlet communicating with the fluid reservoir at a point below the level of the bearing inlet and its outlet communicating with said bearing inlet, means for driving said pump from the shaft of the machine which is supported by the bearing being lubricated, a lubricating fluid sump located below the level of the bearing, means for draining lubricating fluid from the bearing to said sump, a fluid pump having its inlet communicating with the fluid sump at a level below the normal level of the fluid in the sump and having its outlet connected with the fluid reservoir at a point above the level of the bearing inlet, and means for driving said pump from the shaft of the machine which is supported by the bearing being lubricated.

6. A lubricating system for a bearing of a machine, comprising a bearing having an inlet, a lubricating fluid reservoir positioned relative to the bearing so as to include and depend below the level of the bearing inlet, the portion of said reservoir depending below the level of the bearing inlet being constructed to maintain a sufficient supply of lubricating fluid substantially at the level of the bearing inlet during idle periods of the machine in readiness for immediate delivery to the bearing upon starting of the machine and for continuous delivery thereafter for a substantial period of time without replenishment of the supply of lubricating fluid, a lubricating fluid pump submerged in the lubricating fluid in the reservoir for delivering lubricating fluid under pressure from said reservoir to the bearing inlet during all periods of operation of the machine, a lubricating fluid sump located below the level of the bearing, means for draining lubricating fluid from the bearing to said sump, means for delivering lubricating fluid from the sump to said fluid reservoir, said means being constructed anad arranged to prevent the withdrawal therethrough of lubricating fluid from the fluid reservoir during idle periods of the machine, said last means being capable of delivering lubricating fluid to said reservoir from the sump at a faster rate than the lubricating fluid is delivered from the reservoir to the bearing inlet, and means for returning excess lubricating fluid from said reservoir to the sump when the level of the fluid in the reservoir rises above the level of the bearing inlet.

7. A lubricating system for a bearing of a machine, comprising a bearing having an inlet, a lubricating fluid reservoir positioned relative to the bearing so as to include and depend below the level of the bearing inlet, the portion of the reservoir depending below the level of the bearing inlet having imperforate walls and bottom to maintain a supply of lubricating fluid substantially at the level of the bearing inlet during the idle periods of the machine in readiness for the immediate delivery to the bearings upon the starting of the machine, means for delivering lubricating fluid under pressure from said reservoir to the bearing inlet during all periods of operation of the machine, and means for returning for re-use lubricating fluid from the bearing to the fluid reservoir at a point above the level of the bearing inlet.

OLIVER D. H. BENTLEY.